Sept. 23, 1969    M. JAUPAIN    3,468,681
GLASS COMPOSITION
Filed Feb. 3, 1966
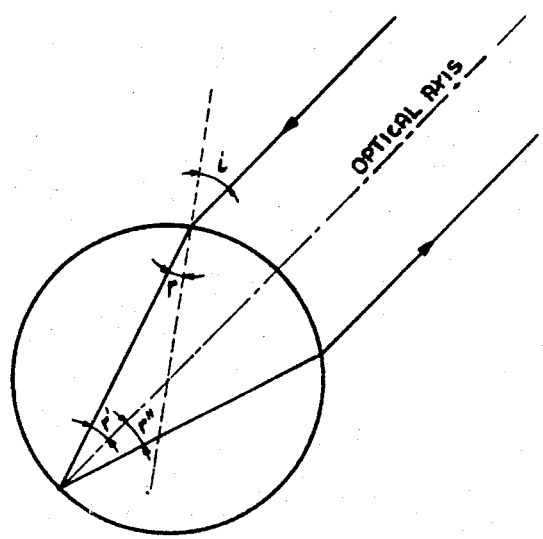
Inventor:
Maurice Jaupain
By: Spencer & Kaye
Attorneys

United States Patent Office

3,468,681
Patented Sept. 23, 1969

3,468,681
GLASS COMPOSITION
Maurice Jaupain, Jumet, Belgium, assignor to Glaverbel S.A., Brussels, Belgium
Filed Feb. 3, 1966, Ser. No. 524,770
Claims priority, application Luxembourg, Feb. 24, 1965, 48,072
Int. Cl. C03c *3/12;* C03b *9/10;* G02b *5/12*
U.S. Cl. 106—47          10 Claims

ABSTRACT OF THE DISCLOSURE

Vitrifiable compositions and compositions of glass prepared therefrom are provided. The glass $TiO_2$ 25–30% by weight, BaO 45–59%, $B_2O_3$ 3–10% and $Al_2O_3$ 13–20%, having a refractive index of from 1.85 to 2, is capable of being formed into perfectly transparent balls of diameters as large as 5 millimeters without devitrification. Such balls are particularly useful in light-reflecting traffic signals.

---

This invention relates to glass compositions with high refractive indices, and more particularly to such glass compositions useful in the manufacture of transparent glass bodies, e.g., balls.

In the manufacture of transparent glass bodies, e.g., balls, useful in traffic warning devices which reflect light from the vehicle lamps back towards the light source, the glass should preferably have a refractive index of about 2 or very close to 2.

Various proposals have been made to manufacture high refractive index glass bodies such as balls by building up these bodies from successive spherical layers with different refractive indices so as to achieve a higher "effective" refractive index. This method is complex, expensive and difficult to control, however.

Also, various vitrifiable batch compositions have been proposed for producing glass with a high refractive index, even appreciably in excess of 2, but these previously proposed compositions have for one reason or another not been suitable for the main purpose set forth above.

It has, for example, previously been proposed to incorporate oxides with a particularly high refractive index, e.g., PbO into a vitrifiable batch. Glasses containing such oxides, however, tend to have insufficient resistance to chemical attack, e.g., by sulphurous fumes. Furthermore, the use of lead oxide can lead to opacification of the glass due to deposition of metallic lead if the batch is melted under certain reducing conditions.

Vitrifiable batches that have been proposed for the manufacturing of high refractive index glasses are generally of very refractory nature. Therefore, the manufacture of glasses from these batches is not very economical. Moreover, the glasses, in general, have such viscosity at temperatures near the melting temperature that they do not lend themselves very well to the manufacture of balls which have a perfectly spherical shape. Such a perfect shape is necessary in the case of glass balls for certain traffic warning devices, for instance.

Another disadvantage of glasses containing a relatively high percentage of oxides with high refractive index is that during the melting of the batches, they give rise to substantial segregation in the batch, making proper homogenization of the molten glass impossible to realize without much time and heat consumption.

A further drawback of the previously proposed high refractive index glasses is that their mechanical strength, and particularly their resistance to shock and abrasion, is only moderate so that they are hardly suitable for making glass bodies for use on roadways where they will be subjected to much wear by the traffic.

It is therefore a primary object of the present invention to provide a glass composition which eliminates the deficiencies and disadvantages of heretofore utilized materials.

It is a further object of the present invention to provide a glass composition from which shaped bodies of glass, having a refractive index of about 2, can be produced.

It is yet a further object of the present invention to provide a vitrifiable composition that will produce the unusual glass of the present invention.

It is still a further object of the present invention to provide a glass composition comprising oxides of titanium, barium, boron and aluminum, such glass being unusually well suited for use in preparing high refractive index bodies, such as glass balls, useful for certain traffic warning devices, for example.

These objects and others ancillary thereto are accomplished in accordance with preferred embodiments of the invention wherein by utilizing the composition of the present invention comprising titanium, barium, boron and aluminum oxides, a glass is produced that eliminates the deficiencies of the heretofore prepared composition. Such a glass has a refractive index of about 2 and is very well suited for the main purpose set forth above.

Additional objects and advantages of the present invention will become apparent upon consideration of the following description when taken in conjunction with the accompanying drawing in which the sole figure of the drawing is a schematic view of a glass ball.

It has now been found that by utilization of the present invention, a glass can be prepared that is well suited for the main purpose set forth above. Such glass can be used also for various other purposes, especially where a high index of refraction is desired.

The unusual glass composition of the present invention comprises the following:

| | Percent by weight |
|---|---|
| $TiO_2$ | 25–30 |
| BaO | 45–59 |
| $B_2O_3$ | 3–10 |
| $Al_2O_3$ | 13–20 |

Bodies formed of this glass will in general have a refractive index in the range from 1.85 to 2.

Such glasses can very easily be formed into shaped, e.g., perfectly spherical, bodies.

Another advantage which the said glasses have over high refractive index glasses hitherto known is the absence of a tendency to devitrify. This allows perfectly transparent pieces to be formed from the glass. Moreover, the glasses possess a high resistance to corrosion in humid atmospheres or under the action of sulphurous fumes in the atmosphere, and also possess particularly high resistance to shock and abrasion.

The present invention includes not only glass as such, having a composition as above defined, and shaped pieces particularly balls, formed from such glass, but also batch compositions from which said glasses can be formed. Such batches or vitrifiable mixtures according to the present invention, comprise the following constituents in the stated proportions by weight:

| Constituent: | Percentages by weight |
|---|---|
| $TiO_2$ | 20.5–26 |
| $BaCO_3$ | 48–63.5 |
| $H_3BO_3$ | 4.5–14.8 |
| $Al_2O_3$ | 10.6–17.3 |

Such batches can be melted and refined very rapidly without showing any tendency to segregation which would prevent a perfectly homogeneous paste from being obtained.

The stated batch ingredients can be inexpensively obtained with a high degree of purity. The melting temperature is low, the mixtures being completely molten at a temperature of 1250° C., which factor favors fuel economy. Moreover, above the melting temperature, the molten batch is very fluid and has a high surface tension which is of particular advantage in forming spherical balls.

This significance of the refractive index of the glass in the functioning of glass balls in light-reflecting traffic signals, e.g., on signboards or at the rear of vehicles or on the road itself, such as at pedestrian crossing and "Stop" signals, will be appreciated by reference to the accompanying drawing. In the case of warning signs intended to be illuminated by the head lamps of approaching vehicles, the reflected light must be brilliant, so that there must be little light absorption or diffusion by the sign, also the light must be reflected back towards the vehicle from which the light is emitted. In general, the light rays are reflected along paths which are inclined at a very small angle with respect to the incident rays. The magnitude of this angle constitutes what is known as the "angularity." The accompanying drawing shows the paths followed by a light ray which is incident on a glass sphere close to the optical axis. In the drawing:

$i$ = the angle of incidence of the light ray on the front of the sphere;
$r$ = the angle of refraction;
$r'$ = the angle of incidence of the ray on the rear face of the sphere;
$r''$ = the angle of reflection of the ray from the rear face of the sphere.

I will be apparent by applying the well known law of refraction:

$$\frac{\sin i}{\sin r} = \frac{n}{N \text{ air}}$$

in which $i$ and $r$ have the meanings above indicated, $n$ = the refractive index of the glass forming the sphere and the N air = the refractive index of air = 1, that in order that a light ray emitted towards the sphere very close to its optical axis may be concentrated, after refraction, at a point exactly located on the rear face of the ball as well as on the optical axis, and thus may be afterwards sent back parallel to its incidental path, the index of refraction $n$ of the glass must be equal or nearly equal to 2. For values of $n$ significantly smaller than 2, the ray would have to be reflected from a point spaced rearwardly from the sphere and this would make it necessary to interpose a layer of some transparent material, of just the right predetermined thickness, between the sphere and the light-reflecting mirror surface of the sphere support. The provision of such a transparent layer without material loss of brilliancy of the reflected light is generally rather expensive. Theoretically, the use of a sphere formed from glass with a refractive index of 2 would entirely eliminate the need for such an intervening layer between the sphere and its light-reflecting support face, and the "angularity" would be practically nil. In practice, glasses with an index refraction in the range from 1.85 to 2 are ideal for achieving the characteristics of brilliance and angularity suitable for traffic signs on vertical panels or on roadways.

The following examples illustrate various embodiments of the present invention. It is to be understood, of course, that these examples are set forth as illustrative only and are in no way to be deemed as limitative of the present invention set forth in the specification and appended claims.

Example 1

Balls were made from glass having the following final composition:

| | Percentages by weight |
|---|---|
| BaO | 48 |
| $TiO_2$ | 25 |
| $B_2O_3$ | 7 |
| $Al_2O_3$ | 20 |

The refractive index of this glass is 1.85.

The balls, which were colorless and perfectly transparent without any devitrification, had a diameter of 5 mm. Their resistance to shock and abrasion was very high, and their resistance to crushing was of the order of 140 kg./mm2.

Example 2

Balls were made from glass having the following final composition:

| | Percentages by weight |
|---|---|
| BaO | 52 |
| $TiO_2$ | 28 |
| $B_2O_3$ | 7 |
| $Al_2O_3$ | 13 |

The refractive index of this glass is 1.9.
The balls were transparent and perfectly colorless.

Example 3

Balls were made from glass having the following final composition:

| | Percentages by weight |
|---|---|
| BaO | 55 |
| $TiO_2$ | 29 |
| $B_2O_3$ | 3 |
| $Al_2O_3$ | 13 |

The refractive index of this glass is 1.95.

The balls had a diameter of nearly 1 mm. They were transparent and slightly colored straw-yellow, making them suitable for introduction into the yellow paint generally used for (road) beacons.

Example 4

The following materials were intimately mixed and melted:

| | Kgs. |
|---|---|
| $TiO_2$ | 280 |
| $BaCO_3$ | 643 |
| $H_3BO_3$ | 88 |
| $Al_2O_3$ | 170 |

The mixture was completely molten at a temperature of 1230° C.

The mixture proved to be very fluid and was quickly refined to a perfectly homogeneous state. Its surface tension was high and perfectly spherical balls were economically formed from the glass. Said surface tension was found to be about 350 dynes/cm.

Example 5

The following materials were intimately mixed and melted:

| | Kgs. |
|---|---|
| $TiO_2$ | 205 |
| $BaCO_3$ | 625 |
| $H_3BO_3$ | 40 |
| $Al_2O_3$ | 130 |

This mixture was completely molten at a temperature of about 1260° C.

Again, the mixture proved to be very fluid and was quickly refined to a perfectly homogeneous state. Spherical balls produced from the glass were colorless and perfectly transparent.

Example 6

The following materials were intimately mixed and melted:

| | Kgs. |
|---|---|
| $TiO_2$ | 255 |
| $BaCO_3$ | 490 |
| $H_3BO_3$ | 140 |
| $Al_2O_3$ | 115 |

Again, this mixture was completely molten at a temperature of about 1210° C.

This mixture was very fluid and was quickly refined to a perfectly homogeneous state. Its surface tension was high and perfectly spherical balls were economically formed from the glass.

As has already been stated, glass according to the present invention can be used for forming components and pieces other than spherical. For example, such glass can be used for making threads and filters, whether fine or of substantial diameter. However, the glass is of particular utility where a high refractive index is desired.

The temperature at which the glass is formed into proper shape can be selected so that the viscosity of the glass is appropriate for the particular forming operation to be used.

In stating the ingredients of the glass and vitrifiable batches according to the present invention, incidental ingredients, e.g., impurities, are not mentioned, but it is to be understood that glass and batch compositions comprising the stated ingredients in the stated proportions together with incidental impurities, recognized as such in glass manufacture, in amounts too small to materially affect the properties of the glass, are not excluded.

It will be understood that the above description of the present invention is susceptible to various modifications, changes and adaptations.

What is claimed is:

1. A glass consisting essentially of:

| | Percent by weight |
|---|---|
| $TiO_2$ | 25–30 |
| BaO | 45–59 |
| $B_2O_3$ | 3–10 |
| $Al_2O_3$ | 13–20 |

2. As an article of manufacture, a shaped article composed wholly or in part of the glass of claim 1.

3. As an article of manufacture, spherical glass balls composed of the glass of claim 1.

4. A traffic warning sign comprising light refracting glass balls as defined in claim 3.

5. The glass of claim 1 wherein said $TiO_2$, BaO, $B_2O_3$ and $Al_2O_3$ are present in an amount of 25%, 48%, 7% and 20% by weight, respectively.

6. The glass of claim 1 wherein said $TiO_2$, BaO, $B_2O_3$ and $Al_2O_3$ are present in an amount of 28%, 52%, 7% and 13% by weight, respectively.

7. The glass of claim 1 wherein said $TiO_2$, BaO, $B_2O_3$ and $Al_2O_3$ are present in an amount of 29%, 55%, 3% and 13% by weight, respectively.

8. A vitrifiable batch composition for preparing glass having a refractive index of from about 1.85 to 2 consisting essentially of:

| | Percent by weight |
|---|---|
| $TiO_2$ | 20.5–26 |
| $BaCO_3$ | 48–63.5 |
| $H_2BO_3$ | 4.5–14.8 |
| $Al_2O_3$ | 10.6–17.3 |

9. Spherical balls according to claim 3 which are perfectly transparent without any devitrification and have diameters as large as 5 millimeters.

10. The use of a composition according to claim 8 to obtain transparent spherical glass balls having diameters as large as 5 millimeters without any devitrification.

References Cited

UNITED STATES PATENTS

| 2,939,797 | 6/1960 | Rindone | 106—47 |
| 2,980,547 | 4/1961 | Duval d'Adrian | 106—47 |
| 3,041,191 | 6/1962 | Duval d'Adrian | 106—47 |
| 3,195,030 | 7/1965 | Herczog et al. | 106—47 XR |
| 3,293,051 | 12/1966 | Searight et al. | 106—47 |

HELEN M. McCARTHY, Primary Examiner

U.S. Cl. X.R.

65—21; 350—105, 109